US008723639B2

(12) United States Patent  (10) Patent No.: US 8,723,639 B2
Butler et al.  (45) Date of Patent: May 13, 2014

(54) HEALTHCARE TELEVISION SYSTEM APPARATUS

(76) Inventors: Joel Butler, Eugene, OR (US); James Edward Colley, Albany, OR (US)

( * ) Notice: Subject to any disclaimer, the term of this patent is extended or adjusted under 35 U.S.C. 154(b) by 298 days.

(21) Appl. No.: 12/940,163

(22) Filed: Nov. 5, 2010

(65) Prior Publication Data
US 2011/0134339 A1   Jun. 9, 2011

Related U.S. Application Data

(60) Provisional application No. 61/283,530, filed on Dec. 7, 2009.

(51) Int. Cl.
G09B 21/00 (2006.01)
H04N 5/44 (2011.01)

(52) U.S. Cl.
USPC .............................. 340/4.1; 348/734; 725/28

(58) Field of Classification Search
USPC ......... 725/81, 78; 704/275; 348/734; 340/4.1
See application file for complete search history.

(56) References Cited

U.S. PATENT DOCUMENTS

| 4,371,979 A | 2/1983 | Vesterling |
| 4,703,359 A | 10/1987 | Rumbolt et al. |
| 4,821,862 A | 4/1989 | Nelson |
| 5,331,353 A * | 7/1994 | Levenson et al. ............. 725/29 |
| 5,477,262 A * | 12/1995 | Banker et al. .................. 725/38 |
| 5,495,301 A | 2/1996 | Mundra |
| 5,502,513 A | 3/1996 | Mundra |
| 5,523,781 A | 6/1996 | Brusaw |
| 5,752,046 A * | 5/1998 | Oprescu et al. ............. 713/300 |
| 5,831,663 A | 11/1998 | Waterhouse et al. |
| 5,905,942 A | 5/1999 | Stoel et al. |
| 5,949,493 A | 9/1999 | Mundra et al. |
| 6,005,486 A | 12/1999 | Fridley et al. |
| 6,008,736 A | 12/1999 | Palm et al. |
| 6,009,465 A | 12/1999 | Decker et al. |
| 6,366,328 B1 | 4/2002 | Vanderpohl et al. |
| 6,532,592 B1 | 3/2003 | Shintani et al. |
| 6,661,471 B1 | 12/2003 | Vornsand |
| 6,857,132 B1 | 2/2005 | Rakib et al. |
| 6,870,475 B2 * | 3/2005 | Fitch et al. ............... 340/539.12 |
| 7,142,256 B2 | 11/2006 | Stoner et al. |
| 7,532,258 B1 | 5/2009 | Galgano |
| 7,639,156 B2 | 12/2009 | Kuijlaars |
| 7,884,703 B2 * | 2/2011 | Sowada et al. ........... 340/286.07 |

(Continued)

FOREIGN PATENT DOCUMENTS

WO   WO0018113 A1   3/2000
WO   WO0147254 A2   6/2001

*Primary Examiner* — Benjamin C Lee
*Assistant Examiner* — Sigmund Tang
(74) *Attorney, Agent, or Firm* — James M Smedley LLC; James Michael Smedley, Esq.

(57) ABSTRACT

An apparatus interposed between a healthcare pillow speaker and an internally-unmodified commodity television where said apparatus powers the pillow speaker, enables the pillow speaker to control the television and drives the pillow speaker with said television audio content. The apparatus is designed to attain applicable healthcare safety approvals. The apparatus is designed to be compatible with standard healthcare equipment and to be placed within new and existing installations. The apparatus can selectively shut off the audio drivers to reduce noise. The apparatus generates its own audio content for the pillow speaker. The apparatus can enable, disable, set access timers, track and report on user access and equipment operational. The apparatus can internally configure limits and alternatives in how the television equipment will be controlled.

25 Claims, 5 Drawing Sheets

(56) References Cited

U.S. PATENT DOCUMENTS

| | | |
|---|---|---|
| 7,966,637 B2* | 6/2011 | Boyden et al. ............... 725/132 |
| 2002/0053086 A1* | 5/2002 | Vanderpohl et al. ............ 725/78 |
| 2004/0052531 A1 | 3/2004 | Engler |
| 2004/0065731 A1 | 4/2004 | Vesterling |
| 2004/0205821 A1* | 10/2004 | Yamada et al. ................ 725/80 |
| 2006/0075437 A1* | 4/2006 | Bambic et al. ................. 725/80 |
| 2006/0217987 A1* | 9/2006 | Sowada et al. ............... 704/275 |
| 2006/0294554 A1* | 12/2006 | Hausman ....................... 725/81 |
| 2008/0209479 A1* | 8/2008 | Zerr et al. ..................... 725/80 |
| 2010/0106519 A1 | 4/2010 | Lemke et al. |
| 2010/0124419 A1* | 5/2010 | Kao .............................. 398/58 |

* cited by examiner

HEALTHCARE TELEVISION SYSTEM APPARATUS

CROSS-REFERENCES TO RELATED APPLICATIONS

This application claims the benefit of U.S. Provisional Patent Application No. 61/283,530 filed Dec. 7, 2009, the entire disclosure of which is incorporated herein by reference.

BACKGROUND

1. Field of the Invention

This invention relates to television systems, specifically those used in healthcare settings and hospital settings.

2. Description of Prior Art

Acute and non-acute healthcare facilities commonly make television systems available to their patients for a variety of content-delivery purposes including entertainment, education and hospitality services. Within patient rooms and clinical settings there are a number of specific concerns that constrain the types of television system provisioned for deployment.

Healthcare television systems are often mounted to a wall where there is a line-of-sight to the display but where it is otherwise not likely to physically interfere with other equipment or activities within the patient room. As a result of this mounting, controls on the display are likely to be out of the patient's direct reach because of distance and or often because a patient's health is compromised and so the patient may be confined or largely confined to a hospital bed or less mobile. A remote control can be provided to operate the television including functions such as powering on/off, adjusting volume and selecting channels. However, infrared remote controls, like those supplied with nearly all modern televisions have innate and significant challenges in the healthcare environment including maintenance costs, device loss, infection control, possible conflict with other electronic devices and being a spark hazard in oxygen-enriched environments. Adding to those challenges is that a single-function device such as an TV remote control becomes another device for the patient and staff to keep track of and where deployed is a missed an opportunity to combine functions within the nurse call signaling device.

Another concern in healthcare settings is delivering audio to the user. Televisions typically have audio speakers mounted within their display cabinet. Use of the cabinet speakers in healthcare facilities is likely to result in the patient turning up the volume to such a level that others within the room or in proximity of the room will be involuntarily subjected to the audio portion of the television content; when this problem is multiplied within a shared room and/or across a set of rooms, this can create a cacophony of unwelcome noise in the facility and this result runs counter to the goal of providing patients with a quiet, healing environment. In addition to the noise problem, a patient may personally dislike the lack of privacy associated with their television content selections being made known to all in the area. A common answer to noise pollution and lack of audio privacy is to disable the cabinet speakers and place an audio speaker in close proximity to the patient. The use of a speaker, especially one used in the patient bed, carries many of the same challenges as with wireless remote controls and the additional one of subjecting patients and staff to the hazards of electrical shock from the connection to the television.

A routinely used device that solves many of the above problems is the healthcare pillow speaker. Healthcare pillow speakers give the patient a means to signal nursing staff as well as being a device that provides for remote control of the television while conveying audio content in close proximity to the patient without increasing environmental noise and preserving content selection privacy. Healthcare pillow speakers often integrate environmental controls such as lighting, curtains, temperature and so have become a single device used for various purposes in the patient room.

Healthcare pillow speakers are routinely wired into the nurse call and television systems by which connections are gained an economical answer to the design challenges of receiving audio, receiving power, conveying remote control commands and also is an effective answer to reducing equipment loss and maintenance costs. Healthcare pillow speakers are designed to attain safety approvals for use in situations where there are concerns for infection control, shock hazards, oxygen-enriched environments and harsh operating conditions. Manufacturers of pillow speakers include Curbell Electronics, Crest Healthcare Supply and Anacom-Medtek.

Healthcare pillow speakers are widely known in hospital and clinical environments but when a television is desired for the patient these pillow speakers are most often paired with specialized commercial healthcare grade televisions. These specialized televisions permit a hardwired connection to the pillow speaker through a receptacle designed in by the television manufacturer on the rear of television housing. The connection between the pillow speaker and the television is typically a three-wire electrical coupling whereby (1) operative power is provided to the pillow speaker from the television, (2) data control codes are transmitted from the pillow speaker to the television and (3) audio signals are conveyed from television to the pillow speaker. Data control codes and operative power are carried on one of the three wires, audio signals are carried on another wire and the third wire is the common reference for the data and audio lines. The pillow speaker-to-television three-wire interface has become a widespread standard and a single healthcare facility can procure and deploy a homogenous mix of healthcare pillow speakers and hospital grade televisions without concern for equipment compatibility issues.

Hospital grade televisions are required to have a general standard safety approval, such as IEC 60065, but also must meet additional safety standard, such as the so-called Annex Q, which addresses limiting the patient's exposure to current leakage, electric shocks and similar hazards. The specialized command and audio interface to healthcare pillow speakers along with hospital-grade safety approvals are what separate healthcare televisions from other more general purpose televisions.

Remote control of the television from a pillow speaker is accomplished by the user pressing buttons on the pillow speaker which transmits control code commands to the television such as "volume up" or "mute". Audio content conveyed from the television to the pillow speaker is that which would be heard along with the video content on the television. Across the range of hospital-grade televisions, each manufacturer has their own connection, electrical and control specifications. Generally available pillow speakers are usually manufactured to be paired with a compatible brand of hospital-grade television interface or alternately pillow speakers can be procured with the ability to be field configured to operate with a wider range of healthcare televisions.

The market for hospital grade televisions is currently served by a limited number of manufacturers such as LG, Philips, Samsung, PDI and HCI where each offers a unit that integrates the pillow speaker connection and where each possesses the desired hospital-grade safety listing mark. When contrasted to consumer and commercial televisions displays, not only is the range of makes and models limited but models offered are typically at least a generation behind the latest consumer and commercial models. One of the main reasons for this contrast to commodity television offerings is the relative lack of potential sales volume for hospital grade televisions. Behind this lack of sales volume are a few causes; first, the very features which make a healthcare television usable in a patient setting provide no value or interest for customers in a non-healthcare environment; second, the total market for healthcare televisions is a small fraction of that for more general purpose consumer and commercial televisions; finally as mentioned, hospital-grade televisions tend to lack features of the latest consumer models and so are not as attractive by comparison. The additional costs for embedding required hospital safety features and the pillow-speaker connection into a television system are then further amplified by their relatively low sales volume. Ultimately, healthcare televisions are very expensive when compared to similar televisions produced for the more general consumer and commercial markets. This cost contrast is often noted by those with the responsibility of acquiring televisions for patient rooms in healthcare facilities and they are left to consider why they are paying a high cost for a television that lags consumer models in features and appearance, yet there is little choice but to pay that relatively high cost in order to deploy televisions into patient rooms.

The lack of sales volume previously discussed creates a larger than needed use of a healthcare facilities financial resources at initial acquisition and this continues through each television replacement cycle. This waste of resources during the replacement cycle is even more regrettable when it is appreciated that the portions of the television system least likely to wear out or break down are those related to interfacing with the pillow speaker and those related to attaining the hospital grade safety listing mark. What has been lacking is a way for a healthcare facility to pay once for the needed safety and pillow-speaker connection features and thereafter obtain replacement televisions to be obtained from the commodity supply chain.

Alternatives to the above-described integrated healthcare television approach have been marketed by companies independent of the hospital grade television manufacturers. One such offering uses consumer televisions that have been given after-market internal modifications and then paired with an interface box that is connected between the modified consumer television and a pillow speaker. Those alternatives have several major disadvantages: 1) as a product the interface box does not address hospital grade regulatory and safety issues and the television, as a result of the after-market modification, will have invalidated any original regulatory and safety listings; 2) these devices typically use consumer televisions which when used in a non-consumer setting can violate terms of the manufacturer's warranty; 3) additional equipment such as the interface box connected to the internally modified television system will likely be a tightly-coupled component, exhibiting a lack of modularity where it is likely that: a) any cost advantage is limited to the initial purchase and not replacements, and b) upgrades to capabilities will be limited; 4) modifications undertaken outside of the original manufacturer may not be able to be repeated on an on-going basis for a variety of business reasons leaving interface boxes less likely to be forward compatible with newer televisions; 5) isolating analog audio signals from an external television and conveying them with high-fidelity and low-noise to a healthcare pillow speaker is a problem which has not been solved; and 6) modifications, to date, rely on one-way communication of remote control commands to the television so there is no interactive verification of the television statuses that enable robust remote control. Though these alternative products are mentioned here, they have not yet achieved legitimate or notable success in the hospital market primarily because they are, as conceived, designed and built, unable to achieve a hospital grade safety listing.

Other prior art has focused on using an interface unit with commercial televisions and addresses isolating only the audio signal from the patient. However, this does not address isolating the patient from other electrical paths including from mains connected to the interface unit and from the television via the data control signal lines. This approach has not been shown to be one that will achieve a hospital grade safety listing mark.

All attempts to use commodity televisions and interface units rely on using one type of audio signal from a television such as using the headphone output but not using line level, digital optical, speaker or HDMI outputs. This reliance on a single type of audio output severely limits the range of compatible commodity televisions as television manufacturers configure a variety of audio outputs across their models. Since those configurations change year to year this reliance also becomes a longer-term product risk as an interface box that can take audio output from last year's model, for example, may not be able to take audio output from this year's model.

Other attempts at providing a television system have been made by creating an interface between pillow speakers and readily available computer displays, where the interfacing device contains a television tuner that delivers video content to the computer display and audio to the pillow speaker. As with the attempts based on televisions these have not had market success due to a number of factors including: substantially smaller display sizes; low-value when compared to televisions; computer display resolutions are generally mismatched with television formats; and finally because these product offerings were unable to attain hospital grade safety listing marks.

Within the deployed environment for healthcare televisions there are aspects of user access and equipment operation that would be useful to be controlled and/or monitored for purposes related to the patient and the equipment. An example of where controlling user access to television viewing is useful can be seen within a facility that rents in-room entertainment equipment as a means to generate revenue, where that revenue can offset some or all of the costs associated with providing in-room entertainment. An example of a useful type of equipment operation control is limiting the maximum television volume that can be selected. An example of user access monitoring is where the patient is provided with medical educational content and an auditable record is kept of the delivery of that content and patient response interactions. An example of useful operational monitoring is to discover patterns of individual and cross-patient usage with respect to entertainment selections and to inform decisions about equipment maintenance and replacement strategies.

Controlling user access to television viewing can be accomplished by moving equipment, such as the television display and pillow speaker, in and out of the patient room. While there is simplicity and security in this approach the effort to accomplish the allocation, scheduling, tracking and physical movement expend facility resources not directly related to patient care. Today some rental solutions involve a third-party provider equipment provider that can also administer access to televisions and share revenue with the healthcare facility, but this type of solution does not provide an answer to the disadvantages of equipment movement, in fact it creates a response cycle where there is likely to be less revenue to be shared with the facility. Also, with the equipment movement model of access control the pillow speaker or any remote control device becomes necessarily dedicated to the single purpose of controlling entertainment and thus the facility cannot attain the cost and patient benefits associated with a using single device incorporating other functions like nurse call and environment control. The people directly involved in the physical act of moving televisions are subject to work-related injuries and if carts are used to facilitate movement of televisions there are difficulties with the larger cart taking up more space within the patient room. When access is meant to be allocated, as it is in a rental-oriented environment, there is always the possibility that the equipment will not become available soon enough after a rental request is made or afterwards be left accessible for longer than originally intended, thereby losing potential revenue.

User access can also be controlled by disabling/enabling equipment through a networked, centralized television content distribution system. In addition to televisions and pillow speakers, those centralized systems require the deployment and maintenance of complex and specialized technologies including networks, servers, operating systems, application software and content subscription services. The costs of acquisition and on-going maintenance are beyond the financial means of many facilities and even among those that can justify the acquisition of such a solution the complexity and hidden costs can result in incomplete, disappointing or failed deployments. An additional factor to consider for these fully-featured and expensive systems is how they will be received in healthcare environments where public funding provides more and more of reimbursements for medical care. In Canada, for instance, where there is currently nationalized healthcare the rental model is widely established and this practice could become more prevalent in markets like the United States.

Tracking and reporting what the patient/user is accessing along with their interactions is not a feature of healthcare televisions or pillow speakers; this can be achieved by an interactive, centralized, networked television content system but again with the associated disadvantages of high costs and difficult implementations. Where there is only the occasional and limited desire to review information on patient/user access the centralized approach may be too expensive for facility to install and maintain.

Configuring operational aspects of the television, like setting a maximum volume or blocking channels, may or may not be available within the television itself. When those aspects are available on the television as a configurable option it will likely require the use of the original television remote control or a special service remote control which may not be readily available after the installation of the pillow speaker control. The pillow speaker, as the remaining device, cannot help in this respect as it is designed to control viewing aspects of the television and not to participate in interactive configuration states. Within a facility, this shortcoming can become more confusing if some of the deployed television systems can be configured and others cannot be configured.

Configuring the television from a pillow speaker would in many situations be ideal but the number of makes and models of healthcare televisions would be difficult for the pillow speaker manufacturers to keep current with and would likely result in changes to their design to accommodate more processing power and larger firmware storage.

Data on the operation of the equipment, the television and the pillow speaker, can provide the facility with important information about each system deployed. Healthcare televisions and pillow speakers are not capable of tracking or reporting such data.

While pillow speakers don't accept commands there are still points in the operation of a healthcare television system where reporting on the state of the television system would be useful such as during installation, configuration and troubleshooting. The speaker portion of the pillow speaker is one place to convey system states but no healthcare televisions are able to use the pillow speaker for any purpose than to convey the audio portion of television content. Similarly in normal operation there are times when the television will give feedback on the display, but being mounted on a far wall the information may not be readable, an example being the sleep timer; pillow speakers aren't used today to provide feedback about operational status and changes to that status.

Healthcare facilities are well-known to often have so-called dirty electrical power as well as being an environment where there can be significant electromagnetic interference from other electrical/electronic equipment. Cabling for in-room entertainment systems can be of a long length and thereby pick-up negative electrical/emission factors often resulting in buzzing, static and humming noises being emitted at the pillow speaker—these noises can be especially notable when the television volume is muted or disabled which is paradoxically the situation when the patient would prefer to hear nothing at all, such as when desiring to sleep. Current television systems do not take always take advantage of the information about volume state to compensate or eliminate noise problems at the pillow speaker. As healthcare facilities design facilities around 'healing environment' concepts, ambient noise in the patient room is being reduced to levels where unintended sounds coming from the pillow speaker becomes more and more noticeable.

Another cause of unwanted electrical-related noise can come from within the television system itself. Some systems use low-cost switching power supplies which generally have switching frequencies outside of the normal range of hearing, however that electrical noise can become demodulated when it enters a linear signal system, such as is used to create electrical isolation for audio signals. This demodulation can produce harmonics in the frequency range in the range of human hearing and this ends up being amplified and heard at the pillow speaker.

In a more general way the sound quality experienced by patients in a patient room has been a historically low-fidelity proposition. The original generations of hospital televisions and pillow speakers were built around the technology of electrical isolation first, remote control second and audio quality last. Over the years the sound quality offered by consumer and commercial televisions has dramatically increased and while pillow speakers themselves have become more capable of higher fidelity the television electronics serving the pillow speaker often fall short of utilizing that capability. One recent product offering only transmitted the left side of the stereo signal to the pillow speaker. Overall, this level of quality experience is even more striking in a marketplace where people have come to regard high-fidelity in personal entertainment devices as a given and look at other feature areas when making a purchase.

In view of the foregoing, it would be desirable to have an improved healthcare grade entertainment system.

SUMMARY OF THE INVENTION

The present invention overcoming these and other problems in the art relates to an apparatus interposed between a healthcare pillow-speaker device and an internally-unmodified, commodity-priced television that (1) can be controlled with commands via an external interface and (2) supplies audio via an external interface. The apparatus may be comprised of one or more of: a housing; a microprocessor; non-volatile storage for firmware programs, user access data and operational data; supporting digital and analog hardware; power components, isolation circuitry, power supplies and other design aspects that enable gaining a recognized listing as "hospital grade"; connections between the healthcare pillow speaker, television and apparatus.

DETAILED DESCRIPTION OF THE EXEMPLARY EMBODIMENTS

Figure 1:
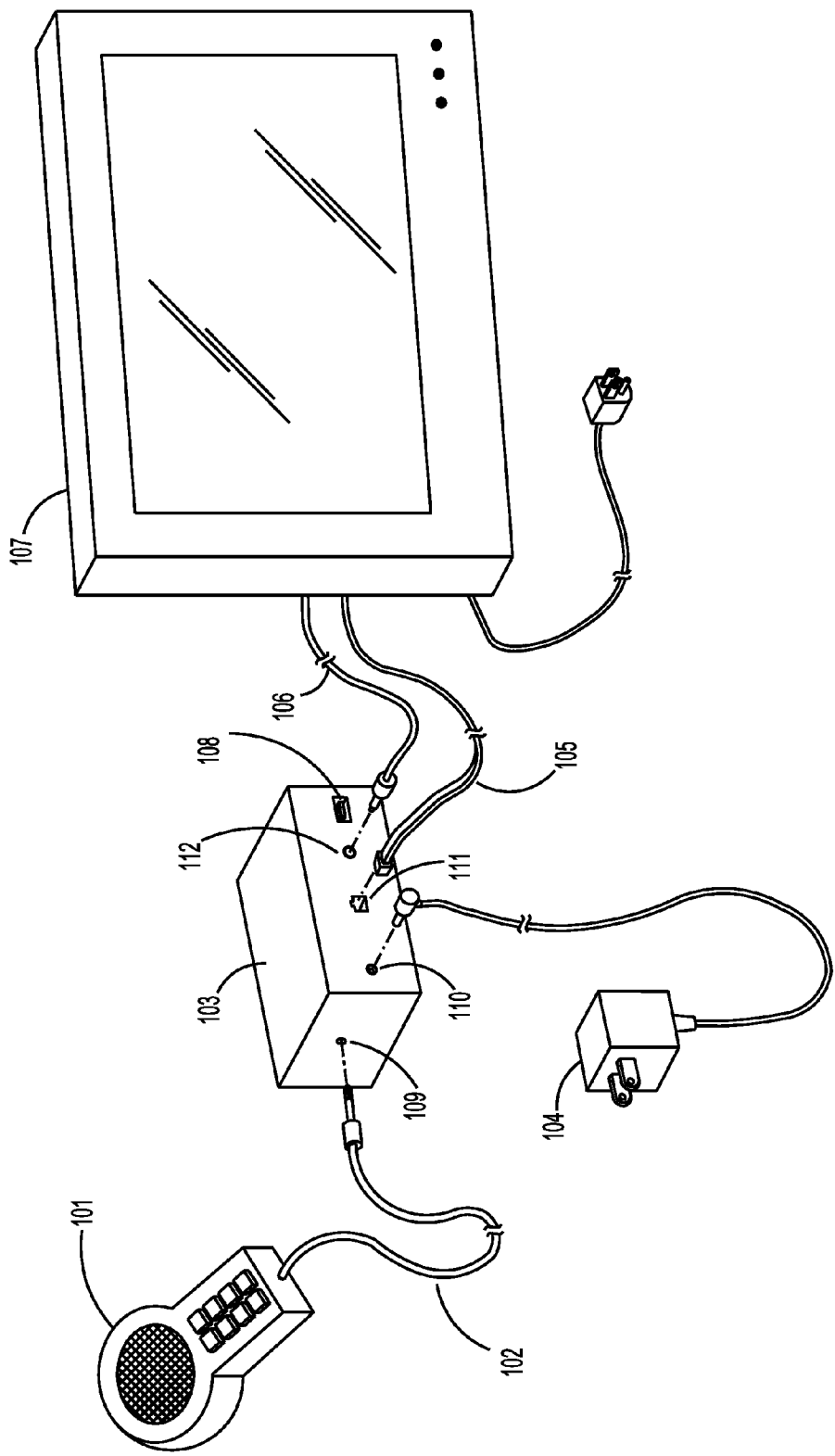
FIG. 1 shows the components of an exemplary installation in accordance with an embodiment of the present invention, including the apparatus, a healthcare pillow speaker, a commodity television, a power supply and connectors.

Referring to FIG. 1 an interface unit 103, in accordance with an embodiment of the present invention, is shown in which a television 107 is connected to interface unit 103 via a media cable assembly 106 at a media communications port 112 and said television 107 is also connected to said interface unit 103 via a control communications cable assembly 105 at a control communications port 111. A pillow speaker 101 is also connected to interface unit 103 via a cable assembly 102 at a pillow speaker communications port 109. Interface unit 103 is connected to a power supply 104 at a power source communications port 110. Though not shown in FIG. 1, television 107 may receive video signals via a direct connection to a conventional television distribution cable or alternately from over-the-air broadcasters via an attached antenna.

Pillow speaker 101 may be of a well-known type as a healthcare communication, signaling and control device used in patient rooms typically placed in or nearby a patient bed. Alternately, the same functions of pillow speaker 101 are integrated into the patient bed such as on a control panel mounted to patient bed's side rail.

Cable assembly 102 exiting pillow speaker 101 may contain wires intended for other devices and purposes outside of the scope of this invention; for clarity, said devices are not illustrated. Likewise, the connection between pillow speaker 101 and interface unit 103 may or may not be direct; in many installations using pillow speakers connected to televisions other physical and logical junction points or branches may exist along the nurse call circuit from pillow speaker 101 to interface unit 103 however the drawing showing cable assembly 102 is simplified for clarity but without impact to understanding by those of ordinary skill in the art. Cable assembly 102 may be comprised of three wires which connect to interface unit 103 via pillow speaker communications port 109, these three wires carry and are generally known as data/power, audio and common.

According to an embodiment of the present invention, power supply 104 may be of the well-known wall-mount AC-to-DC converter type. In this embodiment power supply 104 is specified as so-called 'medical grade' which indicates said power supply is either listed, recognized or otherwise approved for usage in a medical setting by a recognized testing agency such as Underwriters Laboratory, Inc.

According to an embodiment of the present invention, television 107 may be procured as a commodity device and does not require hospital grade listing, recognition or other approvals. Television 107 may have an external control port, such as a DB-9 connector for RS-232 communications, available as a standard feature of said television allowing it to receive control commands from a suitably electrically coupled device.

Control commands received at the external control port on television 107 are processed by said television 107 and are capable of controlling discrete functions such as powering on, powering off, changing channels, increasing audio volume, muting and the like. The set of available control commands permits, at least, the minimal ability at the external control port of accomplishing normal and extended operations of television 107.

External control ports such as described here are commonly accessed from the back or the side of a television and for clarity are not shown in FIG. 1. Control ports vary among brand and models but are known by names such as 'Ex-Link' (Samsung brand) and 'RS-232 Control/Service' (LG brand). One of ordinary skill in the art would appreciate that embodiments of the present invention will work with numerous types of control ports, and embodiments of the present invention are contemplated for use with any type of control port.

In the exemplary embodiment shown in FIG. 1, interface unit 103 issues commands via control communications port 111. Commands are transmitted over control communications cable assembly 105 to television 107 and in the same manner said television 107 can transmit command status and device status back to said interface unit 103. One of ordinary skill in the art would appreciate that the commands could be transmitted wirelessly or in part wirelessly and in part via control communications cable assembly 105.

Television 107 has at least one media connector by which said television's media content can be output to media communications port 112 of interface unit 103 via media cable assembly 106. One of ordinary skill in the art would appreciate that the media content could be transmitted wirelessly or in part wirelessly and in part via media cable assembly 106. Media content may include, but is not limited to, analog audio, analog video, digital audio, digital video and data. One of ordinary skill in the art would appreciate that there are numerous types of media content that may be communicated, and embodiments of the present invention are contemplated for use with all types of media content.

In an exemplary embodiment in accordance with the present application, media content may be comprised of an analog audio source signal. The analog audio source signal can be of the line-level type or of the variable-signal type such as used to drive headphones and external speakers. Television 107 media content connectors are usually accessed from the back or the side of the cabinet and for clarity not shown in FIG. 1. Media communications port 112 of interface unit 103 may be electrically coupled with line-level or variable-signal analog audio signal types.

Optionally, interface unit 103 may have a user access operation control port 108. User access operation control port 108 in FIG. 1 is a USB type receptacle. One of ordinary skill in the art would appreciate that any number of receptacles may be used as user access operation control port 108, and embodiments of the present invention are contemplated for use with any type of user access operation control port 108. Alternatively, user access operation control port 108 may be a wireless communications port, allowing for user access control operations to be communicated via wireless methods.

Figure 2:
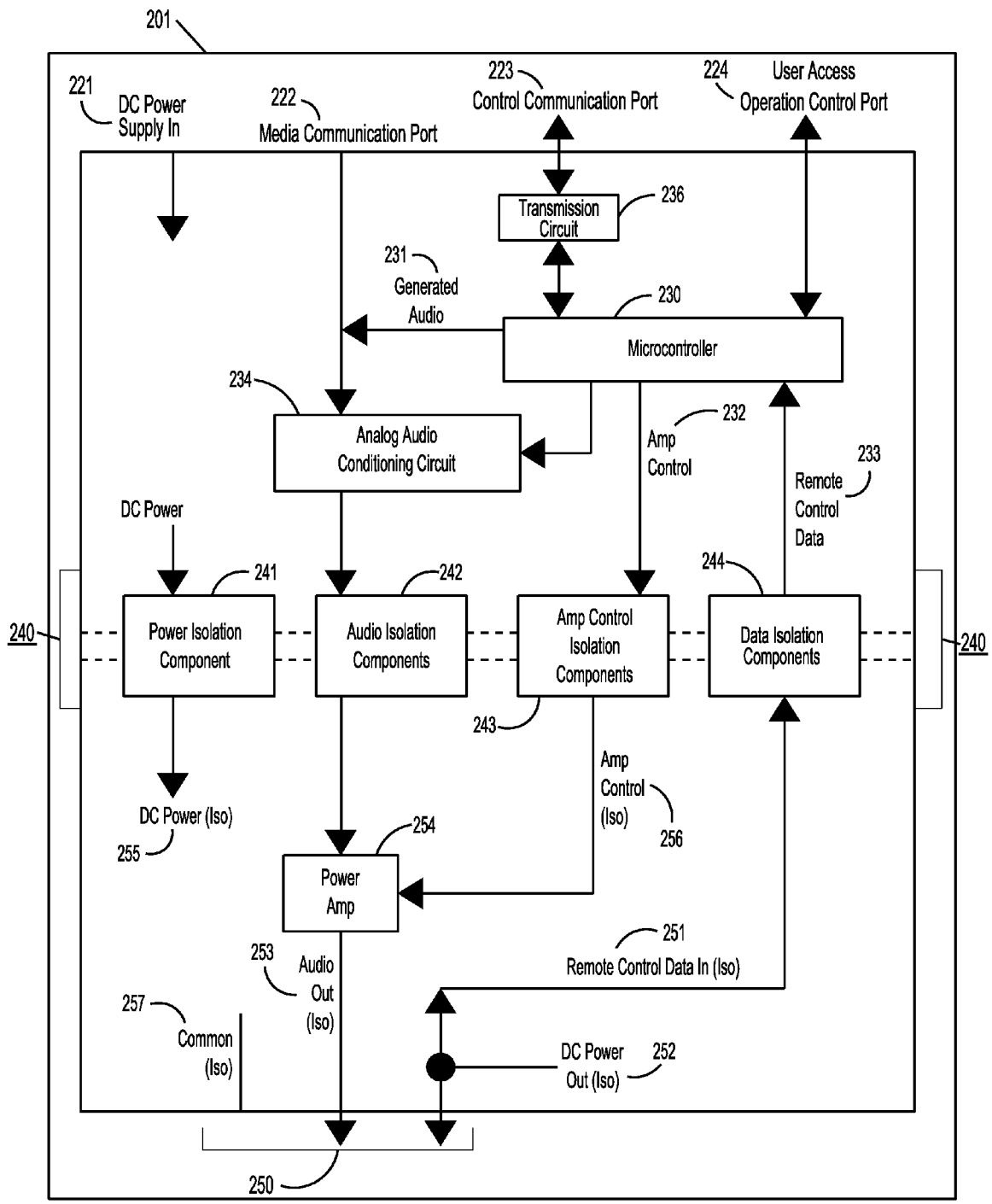
FIG. 2 is a block diagram of the electronics of an exemplary apparatus in accordance with an embodiment of the present invention, showing external connections, processing circuitry and elements designed to conform to performance required to obtain hospital grade safety approvals.

Contained within interface unit 103 of FIG. 1 is an electronic assembly 201 shown in FIG. 2. Electronic assembly 201 is comprised of a microcontroller 230 and software (not shown) operative to accomplishing a myriad of aspects of said electronic assembly 201 and interaction with attached external devices. One example of microcontroller 230, in accordance with an exemplary embodiment of the present application, is AVR32UC3B064 from Atmel Corporation. One of ordinary skill in the art would appreciate that other similarly capable commonly known microcontrollers could be used with embodiments of the present invention, and embodiments of the present invention are contemplated for use with any microcontroller.

According to an embodiment of the present invention, electronic assembly 201 is divided into two distinct electrical sections, with said sections possessing no direct electrical connections, where said sections possess power and ground separate from each other and where said sections are bridged only by a component set 240. The separate electrical sections are illustrated in FIG. 2 as being placed vertically above and below component set 240 with the physical non-conductive portion of electronic assembly 201 represented by a gap 245. The upper portion of electronic assembly 201 is provided power directly from a DC Power Supply In line. Component set 240 is intentionally and exclusively comprised of components providing galvanic isolation of power and signals thereby providing isolated power to the lower section of electronic assembly 201 and permitting operational interactions between the two electrically separate sections.

According to an embodiment of the present invention, DC power supply may be provided by a medical grade power supply. Medical grade power supplies, among other design features, exhibit lower levels of current leakage as well as electrical isolation from mains. Interface units are generally developed to function as interconnect and translation points between two devices that are not natively able to connect and interoperate. While this is true of interface unit 103, it is also performing the function of isolating the patient from any hazardous contact with electricity and so the use of a medical grade power supply, with previously described features, is a redundant level of protection. This redundant protection is an aid to gaining hospital grade approval and also forms a marketing advantage that is expected to show as a safety feature that will mitigate any concerns possibly arising from the television system incorporating an interface unit. The design of interface unit 103 is built around achieving electrical isolation between pillow speaker communication port 109 and anything else electrically coupled to said interface unit 103.

An additional advantage achieved from the use of medical grade power supplies is the increased potential for obtaining hospital listing marks, a feature that is likely to increase sales opportunities.

In an alternative embodiment of the present invention, DC power supply may be provided by a non-medical grade power supply. In this embodiment, electrical isolation is still achieved in a manner as described above, yet the redundant isolation may or may not be achieved with a non-medical grade power supply.

In yet another alternative embodiment, DC power supply may be provided via other well known power communication methods (e.g., power from USB cables). One of ordinary skill in the art would appreciate that there are various types of power communications methods that could be used with embodiments of the present invention, and embodiments of the present invention are contemplated for use with any type of power communication method.

According to an embodiment of the present invention, DC power is conveyed from the primary portion of electronic assembly 201 to the secondary or isolated portion through a power isolation component 241 an example of which could be a DC to DC converter such as the VBSD1 from CUI, Inc. Isolated power from power isolation component 241 is distributed by a line DC power (iso) 255. One of ordinary skill in the art would appreciate that other commonly known power isolation components could also be used with embodiments of the present invention, and embodiments of the present invention are contemplated for use with any power isolation component.

According to an embodiment of the present invention, electronic assembly 201 may be comprised of an analog audio path comprised of 1) a media communications port 222, 2) an analog audio conditioning circuit 234, 3) an audio isolation components 242, 4) a power amplifier 254 such as the TPA311D from Texas Instruments and 5) a line audio out (iso) 253 which may be connected to a pillow speaker communication port 250. Audio isolation components 242 could include the HCNR200 high-linearity optocoupler IC from Avago Technologies. One of ordinary skill in the art would appreciate that numerous other optocouplers could also be used with embodiments of the present application, and embodiments of the present invention are contemplated for use with any optocouplers.

Microcontroller 230 generates analog audio signals which are then summed into the analog audio circuit path via a line generated audio 231.

Signals to enable and disable power amplifier 254 are originated in microcontroller 230 and transmitted through a circuit comprised of an amp control line 232, an amp control isolation components 243 and an amp control (iso) line 256. Amp control isolation components 243 could be an optocoupler IC such as 4N35-300E from Avago Technologies. One of ordinary skill in the art would appreciate that other commonly known galvanic isolation components could also be used, and embodiments of the present invention are contemplated for use with any galvanic isolation component.

Data signals are brought into electronic assembly 201 at the pillow speaker communications port 250 and are transmitted to microcontroller 230 through a circuit comprised of a remote control data in (iso) line 251, data isolation components 244 and a remote control data line 233. Data isolation components 244 can include, but are not limited to, an optocoupler of the same type used for amp control isolation component 243 though other commonly known galvanic isolation components could also be used. One of ordinary skill in the art would appreciate that other commonly known galvanic isolation components could also be used, and embodiments of the present invention are contemplated for use with any galvanic isolation component.

Microcontroller 230 transmits and receives data signals to/from a connected television or other device through a transmission circuit 236 and a control communications port 223. Microcontroller 230 may have an on-board UART and transmission circuit 236 may be a driver IC such as MAX32211PWR made by Texas Instruments. One of ordinary skill in the art would appreciate that any number of other commonly known components could also be used, and embodiments of the present application are contemplated for use with any other commonly known component.

Microcontroller 230 is connected to a user access operation control port 224. Devices such as USB storage drives can be connected to electronic assembly 201 through user access operation control port 224 permitting external devices to have two-way communication with microcontroller 230. Devices that may connect to user access operation control port 224 include, but are not limited to, USB storage drives, flash media, DVD players, Blu-Ray players, mp3 players, computing devices and smart phones.

When a device capable of communicating media content is connected to user access operation control port 224, user access operation control port 224 may act and function like media communications port 221. In this embodiment, connected devices may communicate media content to microcontroller 230 for processing and communication to a pillow speaker communications port 250 or another media communications port 221. For example, a hospital employee may connect a DVD player to user access operation control port 224 which then causes user access operation control port 224 to function as a media communications port. Media content is provided from the DVD player to the microcontroller 230, where an audio portion of the media content may be separated from the a video portion of the media content. The audio portion of the media content may then be transmitted to the pillow speaker via pillow speaker communications port 250 and the video portion of the media content may be transmitted to a television via a media communications port 221.

According to an embodiment of the present invention, microcontroller 230 may generate media content or process internally stored media content. For example, microcontroller 230 may load media content from an onboard storage medium (e.g., hard drive, flash memory, solid state drive), process the loaded media content accordingly and communicate the media content via pillow speaker communications port 250, media communications port 221, user access operation control port 224 or any combination thereof. In another example, microcontroller 230 may generate media content (e.g., an audible alert sound capable of notifying a person of a successful key press) and communicate the media content via pillow speaker communications port 250.

A DC power out (iso) 252 line may communicate power from the isolated portion of electronic assembly 201 to a pillow speaker via the combined data/power wire of the pillow speaker communications port 250.

Electronic assembly 201 is provided with a power boost circuit 258 comprised of switching mode IC regulator and surrounding passive electronic components which can generate +12V from a +5V input. Boost circuitry is accompanied by commonly known jumper pins so that either the +5V or +12V DC output can be obtained at DC power out (iso) 252. The switching mode IC regulator can be a LM27313 from National Semiconductor. One of ordinary skill in the art would appreciate that any number of other commonly known components could also be used, and embodiments of the present application are contemplated for use with any other commonly known component.

In operation, referring to FIG. 1, pillow speaker 101 for a hospital patient can be a critical signaling device of the healthcare facility nurse call system (not shown) but also often incorporates additional button controls provided to allow said pillow speaker to function as a device which remotely controls a television located in the patient room. Pillow speaker 101 also has an audio speaker often intended to function as a nurse call intercom but is also often used to emit, in close proximity to the patient-user, the audio content portion from an attached patient room television 107. As the operation of any pillow speaker is, in large part, reliant on electricity and intended to be handled and operated by a person who is ill, injured or otherwise in compromised health, electrical isolation such as seen in this embodiment is an essential element required to obtain a recognized hospital grade safety listing mark that is associated with enabling the marketing, sale and installation of audio and video equipment used within patient rooms.

In this embodiment pillow speaker 101 is electrically coupled to the isolated portion of electronic assembly 201 shown in FIG. 2 and therefore pillow speaker of FIG. 1 is isolated from electrical faults arising from mains and all other devices connected to electronic assembly 201 of FIG. 2. When electronic assembly 201 is connected and powered by a medically approved DC power supply the power isolation component 241 provides dual or redundant protection from mains. To further expose the embodiment with respect to the attainment of a hospital grade listing mark it can be seen that the elements connected to the electronic assembly 201, such as power supply at DC power supply 221, a television at media communications port 222, a television at control communications port 223 and a USB device at user access operation control port 224 are all electrically isolated from the pillow speaker communications port 250 due to the separate and divided sections of electronic assembly 201 where the only means for power and signals to bridge the sections is via component set 240 and where said component set is comprised of only galvanic isolation devices each of which is selected to provide a passive barrier to electrical faults.

Continuing, it can be more generally appreciated that any device electrically connected to one of the sections of electronic assembly 201, such as television 107 (FIG. 1) or power supply 104, is then electrically isolated from any device connected to the other side of said electronic assembly, such as a pillow speaker. Accomplishing this isolation for patient safety is a key design and performance aspect that permits interface unit 103 of FIG. 1 to obtain a hospital grade safety listing mark. The advantage of this modular system architecture where interface unit 103 carries the specialized circuitry for electrical isolation allows for the television display component to be procured from the consumer supply chain where innate sales volumes of those models are advantageously less costly even when paired with additional components of this system for hospital usage. It also allows the television to be looked upon as a replaceable unit, that is, interface unit 103 can be a one-time purchase and so when subsequent replacement displays are installed the cost of interface unit 103 is amortized over the span of display purchases, this being a further cost advantage over conventional hospital grade televisions where the entire and more expensive specialized and integrated unit is replaced.

Another advantage of this modular system architecture and the associated ability to procure commodity television displays is realized when the purchasing facility is able to procure from a supply chain where makes and models are expected to have the latest features and benefits such as reduced power consumption, improved backlighting technology, more display size choices and higher audio/video quality. This advantage is contrasted with conventional hospital grade television product lines which tend to be refreshed from a design standpoint over longer time intervals and even then changes are often limited to the more utilitarian features.

When a television remote control button is depressed on pillow speaker 101 (FIG. 1), such as TV power on, encoded signal data is generated and transmitted by pillow speaker 101 and received by interface unit 103 via pillow speaker communications port 109; said signal data may be encoded in one or more standards, for example the RC5 protocol when pillow speaker 101 is configured to be compatible with a Philips television. After interface unit 103 receives the signal data the operative software on microcontroller 230 (FIG. 2) attempts to decode said signal data and if successful said operative software processes creates a button press event of the type corresponding to the actual button pressed on pillow speaker 101 (FIG. 1), for example a power button press event would be created by the operative software when the power button was pressed on said pillow speaker. Continued processing by the operative software within interface unit 103 of any button press event depends on the type of button press event seen and further depends on the context of other recently received button press events, the operational state of interface unit 103 and internally held states of external devices connected to said interface unit.

One of the more direct and typically intended system outcomes of a button press event within interface unit 103 is the forming and transmission of a control command to television 107 via control communications port 111. For example, a volume-up button press at pillow speaker 101 would lead to the processing of a button press event of the type "volume-up". Microcontroller 230 shown in FIG. 2 using operative software and a transmission circuit 236 would then form and transmit an equivalent command to television 107 of FIG. 1 with the expected outcome being an incremental increase in audio volume.

Continuing the description of typical remote control operation of television 107 by pillow speaker 101 the operative software recognizes a set of button press encodings and takes actions on that set, often sending control commands to the external control port of said television 107. The overall outcome of remote control processing by operative software is a user experience of pillow speaker 101 as a remote control that is as intuitive, responsive, reliable and familiar to the user as the well-known infrared remote controls commonly used with consumer televisions.

After the transmission of a control command to television 107 of FIG. 1, interface unit 103 can wait for a response from said television with any said response data being issued by said television as one or more type of acknowledgments including transmission receipt, control command acceptance, control command success/failure and current status of said television. All transmissions from television 107, whether synchronous or asynchronous, can be received by interface unit 103 and employed to change internally tracked states with said states providing a basis for immediate action by interface unit 103 and/or for providing updated context for the operative software processing of future button press events. This processing of pillow speaker 101 button presses by interface unit 103 creates, as with and along with electrical isolation, describes a system architecture that results in a system that offers the advantages of a conventional hospital television but enables the procurement and use of an unmodified commodity television with the attendant cost, feature and flexibility advantages.

In addition to using a pillow speaker for remote control of a television, button presses can be used to place interface unit 103 into modes or states where other functionality can be accessed and controlled. The general method to enter other functional states is where the operative software of interface unit 103 identifies a predetermined button press event or set of button press events and upon identification takes action to place interface unit 103 into an operational state where further button press events will be acted on within the context of said operational state. These predetermined button press events are chosen to be of a type not seen within the normal pattern of remote control operation. Examples include, but are not limited to: button press sequences such as mute-sleep-mute-sleep-mute-sleep; button press hold-downs for extended periods of time; button presses within certain operational windows such as holding down the mute button on pillow speaker 101 during a power-up cycle of interface unit 103. The ability to detect these special button press events permits a myriad of special operating states to be entered extending the range of functionality and customization beyond that seen with conventional hospital grade televisions.

As there are no existing standards for external control communications port commands and transmission protocol across the different makes and models of consumer televisions possessing external control ports and as it is desirable that interface unit 103 achieve broad compatibility across the range of said consumer televisions the operative software of interface unit 103 is capable of outputting one or more of a plurality of command sets and of using one or more of a plurality of transmission protocols. In addition to the usual method of configuring command set and protocol settings at the time of manufacture or shipping, interface unit 103 can also be usefully configured in the field at the time of installation or as part of a service or upgrade activity. This field configuration employs the method where the operative software looks for a pre-determined button event or events thereby allowing the installation or service user to then further use pillow speaker 101 button presses to be select desired settings to configure interface unit 103 to compatibly connect to and issue commands from the control communications port of interface unit 103 to the external control port of a specific make and model of television 107. With the availability of multiple remote control command sets interface unit 103 is advantageously able to work with more televisions thus increasing volume of production for said interface unit 103 and enabling the healthcare facility to procure televisions without the added concern for installing or maintaining a homogenous population of interface units and compatible televisions.

In existing patient room installations pillow speakers will typically be designed or configured to operate with one of the conventional brands of healthcare televisions. One of the functions performed by a healthcare television is to provide operating power to an attached pillow speaker and across the range of available healthcare televisions there is no single standard for power so provided. In any exemplary embodiment in accordance with the present invention, interface unit 103 performs the function of providing power to pillow speaker 101 via pillow speaker communications port 109 and as it desirable to achieve broad compatibility across the range of available and existing installations of pillow speakers said interface unit 103 is capable of providing a selectable +12V or +5V power with the selection of a voltage level thereby intended to match the power requirements of a given pillow speaker 101. To support correct provisioning of power for different healthcare television installations, interface unit 103 (FIG. 1) can be configured via jumpers on electrical assembly 201 (FIG. 2). After installation of healthcare television systems, the need to change power requirements are not routinely expected but the capability to make field changes facilitates other desired characteristics such as plug-and-play installation, the use in a facility installation of one configurable interface unit 103 (FIG. 1) across a population of pillow speakers that is or may become heterogeneous and also creating economy of scale in the production and marketing of said interface unit by reducing the number of needed stock keeping units.

Alternatively, the selection of voltage levels provided by electronic assembly 201 could be accomplished with any one of commonly known jumper-less designs such that setting and changing voltage levels could occur without opening the enclosure of interface unit 103 of FIG. 1.

Similar to the already described different power requirements of pillow speakers there are also differences in what form of modulated data encoding will result from pillow speaker button presses with said differences tied to what make/model healthcare television the pillow speaker has been designed or configured to attach to. According to an embodiment of the present invention, interface unit 103 has the ability to decode, via operative software, a plurality of modulated data signals of which one can be selected and configured for normal operations. Interface unit 103 has various means of selecting the appropriate decoding configuration including attempting at power-up to decode modulated signals using a sequence of different decoding methods while an operator at pillow speaker 101 is intentionally holding down a pre-determined remote control button, such as "mute", with said interface unit successfully identifying the correct decode method to configure by successfully decoding the expected button press event. This capability allows installation of a single model of interface units to be deployed within an existing population of pillow speakers that are not necessarily configured to operate with the same make and model of hospital grade television. This feature also allows for a heterogeneous population of pillow speakers with respect to compatibility with interface unit 103.

The range of consumer televisions possess a variety of audio output ports. However, two common analog electrical format types exist. One of the common analog electrical formats is the type intended to be output from a television to a set of headphones where the audio volume changes of the television are heard in said headphones; the second of common type of analog electrical format is the line-level type which has relatively lower current and is meant to be output from the television to devices such as an external audio amplifier and where the analog audio signal level is constant, that is, not affected by changes in the television volume settings. Even though cable adapters may be employed to achieve a physical connection from these analog output ports, from an operational standpoint these output formats are not natively interchangeable, that is, you cannot obtain good results when connecting a set of headphones to a line-level type output and likewise you cannot obtain good results when connecting an external audio amplifier to the headphone connection. As it is desired that interface box 103 of FIG. 1 be broadly compatible with the range of available audio output types this embodiment employs circuitry designed to permit connection to either headphone and line-level outputs and to accomplish volume control over both. Further along the lines of broad compatibility, interface box 103 employs media communications port 112 which accepts either type of analog audio signal.

In addition to the usual method of configuring interface unit 103 (FIG. 1) at the time of manufacture or shipping to expect the input of either the headphone or line-level type of analog audio signals, said interface unit 103 can also be usefully configured in the field at the time of installation or as part of a service or upgrade activity. This field configuration employs the method, as has been previously described, of using pillow speaker 101 button presses to enter a service or configuration state and thereby allowing the installation or service user to continue to use pillow speaker 101 to select the desired analog audio settings.

Figure 3:
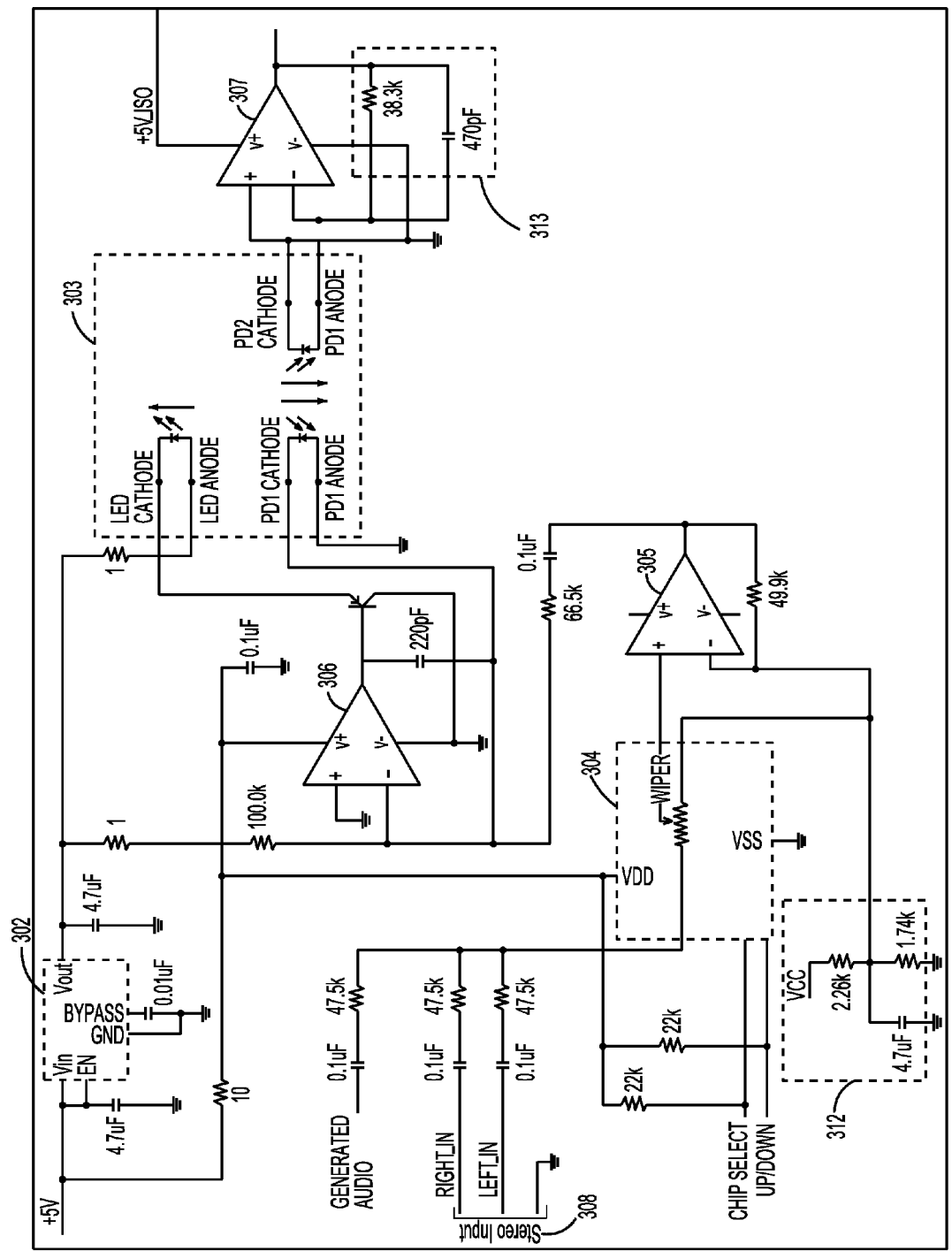
FIG. 3 is a schematic showing an exemplary embodiment in accordance with an embodiment of the present invention of an analog and digital design that conveys audio input from a commodity television to a pillow speaker emphasizing elements that reduce induced noise, increased dynamic range and frequency response, enable connection to both fixed and variable signal level audio signals and accomplish high-fidelity galvanic isolation.

Referring to FIG. 2, an analog audio signal received at media communications port 222 can be of the type intended to be output from a television to a variable-amplitude source such as a headphone type output or a fixed-amplitude source such as a line-level type output. Referring now to FIG. 3, a digital potentiometer 304 provides the necessary user volume adjustment for fixed amplitude sources, and for variable amplitude sources, a fixed setting where said setting is chosen to optimize dynamic range of the audio channel. When a fixed amplitude source is used, digital potentiometer 304 enabled and controlled, respectively, by a chip enabled line 309 and an up/down line 310, with both lines originating at microcontroller 230 (FIG. 2) and under control of the operative software.

Some attenuation must be provided at the stereo input of the channel 308 and at the digital potentiometer 304 as the input may exceed the supply rails. Also, a single supply is used to minimize cost and this necessitates the use of a low-impedance reference 312 midway between the analog rails.

Placement of digital potentiometer 304 is critical. If the digital potentiometer 304 was placed around op amp 305, then a lower overall dynamic range would result, and the volume could not be turned all the way to zero because the potentiometer 304 settings need to be limited to insure that the gain never goes significantly below unity, where stability margins would be compromised. Another alternative would be to move potentiometer 304 between op amps 305 and 306.

The analog audio signal is then conveyed from the non-isolated portion of electronic assembly 201 of FIG. 2 to the isolated portion using a signal isolation component 242 such as the HCNR200 high-linearity optocoupler device from Avago Technologies. Audio isolation component 242 uses feedback to operational amplifier 306 of FIG. 3 to achieve high-fidelity conveyance of the audio signal to the isolated portion of electronic assembly 201 (FIG. 2). The isolated audio signal is output through operational amplifier 307 (FIG. 3) and into a circuit comprised of a resistor-capacitor network and then a power amplifier 254 (FIG. 2) such as the TPA311D from Texas Instruments, which is connected to the line audio out (iso) 253 portion of the three-wire pillow-speaker interface, via pillow speaker communications port 109 of FIG. 1. The signal being one which can drive the speaker of pillow speaker 101 of FIG. 1.

Referring to FIG. 3, digipot 304 needed to produce and control volume when the system is configured to expect line-level type analog audio signal input and in this embodiment this is accomplished via the up/down 310 line which alters the resistive value of said digital potentiometer and under the control of operative software enables a dynamic response to volume-oriented button-press events reproducing the volume changes seen in the headphone type audio signal. When the system is configured to expect headphone type analog audio signal input the operative software sets the digital potentiometer to a suitable and fixed resistive value and processes volume oriented button-press events by sending appropriate volume commands to the external command port of television 107 of FIG. 1.

Audio signals from television 107 may be received at interface unit 103 at media communications port 112 via media cable assembly 106 and are passed through to the isolated side of the electronic assembly of FIG. 2 by using audio isolation components 242. According to an embodiment of the present invention, isolation of audio signals may be achieved through the use of an optocoupler with supporting circuitry. This embodiment solves concerns associated with achieving the correct amplification before and after optocoupling, not exceeding the specs of the optocoupler and tuning the stability and predictability of the overall circuit to achieve best possible audio quality when using power amplifier 254 to drive a pillow speaker device.

Microcontroller 230 produces modulated signals under control of the operative software with said modulated signals summed into the analog audio circuit path via generated audio 231 line. In simplest form this these modulated signals would allow electronic assembly 201 to produce a variety of sounds when the operative software applies different frequencies, durations and duty cycles. Microcontroller 230 could also be chosen with additional on-board capability to generate more complex audio including sampled and digitized voice annunciation. Those skilled in the art could also employ specialized audio generation devices, such as application specific integrated sound components without using microcontroller 230. The generation of audio content by microcontroller 230 has a range of uses including error alerts, augmenting the patient-user interface with audible feedback on operating pillow speaker 101, alerting the patient-user to status of the system operation, interactively prompting service personnel using service states and delivering specific educational and entertainment content to patients. This feature of the present invention makes the system more interactive where pillow speaker 101 achieves a new level of utility where context-sensitive content originates from interface unit 103.

As in any analog audio system, problems with audible noise emitted at a pillow speaker can be introduced from intrinsic and extrinsic sources. As healthcare facilities are well-known to be frequent sources of electrical noise and also as healthcare environments are desired to be as quiet as possible, electronic assembly 201 employs a means to shut down the power amplifier 254 under control microcontroller 230. To illustrate, microcontroller 230 receives a mute button-press event and it can accomplish this by shutting down power amplifier 254 in addition to forming and sending a mute command to television 107 (FIG. 1). In this situation and others shutting down power amplifier 254 (FIG. 2) prevents intrinsic and extrinsic electrical noise in the signal path from being transmitted-to and emitted-at pillow speaker 101 (FIG. 1). The signal path to control power amplifier 254 (FIG. 2) passes through amp control isolation components 243 preserving the design approach taken to attain hospital grade safety listing mark. In this manner the present invention contributes to the goal of a quieter patient room and accomplishes this without compromising patient safety.

Another source of noise is a hospital-grade television is the power supply. Switching power supplies often have switching frequencies (or modulation products) in the audible range. Likewise linear supplies can produce audible hum. In systems incorporating galvanic isolation, such as hospital televisions, the most vulnerable point for this supply noise is the LED anode of an optocoupler. The gain from this node to the speaker output is very high, because of the nonlinear V-I characteristic of the LED. Conventional series-resistor, shunt capacitor supply bypass (low-pass filter configuration) is not effective in this case, because the LED current is high (several mA range), necessitating the use of a very small resistance value to avoid significant voltage drop. In order to get a cutoff frequency which is well below the supply noise frequency, a very large capacitor value with very low electrical series resistance (low ESR) is required. Such capacitors are prohibitively expensive and physically large which, in contrast to hospital-grade televisions, is not compatible with the cost and size aims of an interface unit approach.

According to an embodiment of the present invention, a low-dropout (LDO) linear regulator 302 (FIG. 3) provides for power supply noise rejection all the way to DC and reduces noise associated with power supplies which create audible switching frequencies and hum. Linear regulator 302 can be effectively paired with small and inexpensive ceramic capacitors. The low-dropout characteristic of linear regulator 302 insures that a good dynamic range is maintained for the audio media content.

According to an embodiment of the present invention, noise may be further reduced through the addition of a real pole on the isolated side of the audio channel, that is, the circuit following optocoupler 303. By positioning one or more of these poles in later stages, such as seen with pole 313, insures that noise introduced by a power source, audio source or other intrinsic or extrinsic noise source will be effectively rejected.

Control of and viewing access to television 107 (FIG. 1) can be secured by placing interface unit 103 into a state where said control is enabled and viewing access is limited to a specific duration of time by the operative software in said interface unit. In the present invention button presses on pillow speaker 101 are the means by which interface unit 103 is placed into the state where control is enabled and also the means by which viewing access duration is entered.

One use of controlling access and viewing duration is to secure television usage at a healthcare facility establishing and operating a rental business model for in-room patient entertainment and the description of this part of the embodiment can be understood by continuing from this assumption of said rental business model where interface unit 103 is configured to operate in a secured access state where all viewing and normal control takes place within a rental period. In such a controlled access state the operative software of interface unit 103 will only allow normal control and viewing of television 107 when a timer, in the operative software, has not expired, where said timer has been previously initialized or re-charged at the beginning of rental usage event.

When a rental period expires the operative software may revert to a condition where the display of television 107 is disabled and attempts to control normal viewing operations of said television via pillow speaker 101 are disregarded by interface unit 103. This type of decentralized system for controlling access is a cost effective answer to the types of centralized systems requiring large scale projects to deploy, staff to maintain and expensive technologies to acquire including networks, servers, operating systems and application software.

The present invention is also a superior answer to existing rental situations dependent on equipment being moved into a patient room and where third-party providers do not respond to rental requests. The present invention can provide secure, inexpensive viewing access control that is simple to administer and timely to accomplish using no other equipment than the already present pillow speaker.

In addition to the well-known method of configuring operation within secured access state at the time of manufacture or shipping, interface unit 103 can also be usefully configured for said state as part of installation and service by employing the method where operative software looks for a pre-determined button event or events thereby allowing the installation user or a facility administrative user to use pillow speaker 101 to field select the desired secured access state setting.

According to an embodiment of the present invention, when interface unit 103 has been configured such that operative software is in secured access state there will be an ongoing need to enter access codes that set the rental period during which time the operative software allows the patient user to have normal control and viewing access to the in-room television 107. This ability to field-configure a system to operate or not operate in secured access mode allows the facility the flexibility of when and where to engage a rental business model. It also allows the facility the means by which a patient could be given access in the event of problems or delays in setting up the rental period.

Setting or re-charging the rental period within interface unit 103 that is configured for secured access is accomplished by employing the method where operative software looks for a pre-determined button event or events thereby allowing the administrative user or concierge to use pillow speaker 101 to enter the access code.

Access codes needed to recharge the rental period may be created to contain a representation of how long said rental period is, but may also embed one of a plurality of types of security encoding schemes. In an exemplary embodiment in accordance with the present invention, an approach used is to construct an access code contains embedded security data components intended to be matched algorithmically to a security identification within the non-volatile memory of microcontroller 230 (FIG. 2). With this approach, there is also provided a way to uniquely identify interface box 103 such that the access code can be correctly constructed. This approach doesn't require that all interface boxes have a unique security designator but access codes are constructed and the operative software designed such that an access code cannot be reused at interface unit 103 until a set number of different access codes have been successfully used and expired. One of ordinary skill in the art would appreciate that there are numerous ways to generate or construct access codes, and embodiments of the present invention are contemplated for use with any method of generating or constructing access codes.

Access codes used to recharge the rental period may be constructed according to an algorithm that uses factors such as (1) the length of the rental period, (2) the security algorithm, and (3) and any other factors needed to produce said access code accepted by interface unit 103 that results in the patient-user being able to use the television system for the specified period of rental.

Access codes could be produced and tracked manually but a computer application is likely the best choice with said application being available for use on a plurality of platforms including, but not limited to, menu-driven phone systems, mobile phone applications, tablet computers, standalone workstations, kiosks, distributed client server and over the internet using software-as-a-service. Administering the rental business could be accomplished by the healthcare facility, a third-party or it could be done on a self-serve basis by a patient or those supporting the patient, such as family members.

According to an exemplary embodiment in accordance with the present invention, a patient, desiring access to the media content, could request a rental access code by using their in room phone or cell phone to call an automated phone system. The automated phone system could provide a rental access code to the patient based on 1) the desired rental period, 2) the desired level of content access (e.g., standard, premium, pay per view) and 3) an identifier related to interface unit 103 located in the patient's room. The patient could then input the rental access code by pressing keys located on pillow speaker 101. The rental access code entered into the pillow speaker would then be communicated to interface unit 103 by way of pillow speaker communications port 109. Interface unit 103 could then process the rental access code and determine if it was valid. If interface unit 103 determines the rental access code is valid, it can then allow the patient to access the media content associated with the rental access code, for a period of time associated with the rental access code.

In another exemplary embodiment in accordance with the present invention, a patient could receive the rental access code from a nurse, hospital employee, family member, friend or a third-party rental provider employee at any time during their stay in the hospital. The rental code could be entered, by the patient or by the nurse, hospital employee or third-party rental provider employee, into the pillow speaker. As above, the rental access code would be communicated to interface unit 103 for processing.

Figure 5:
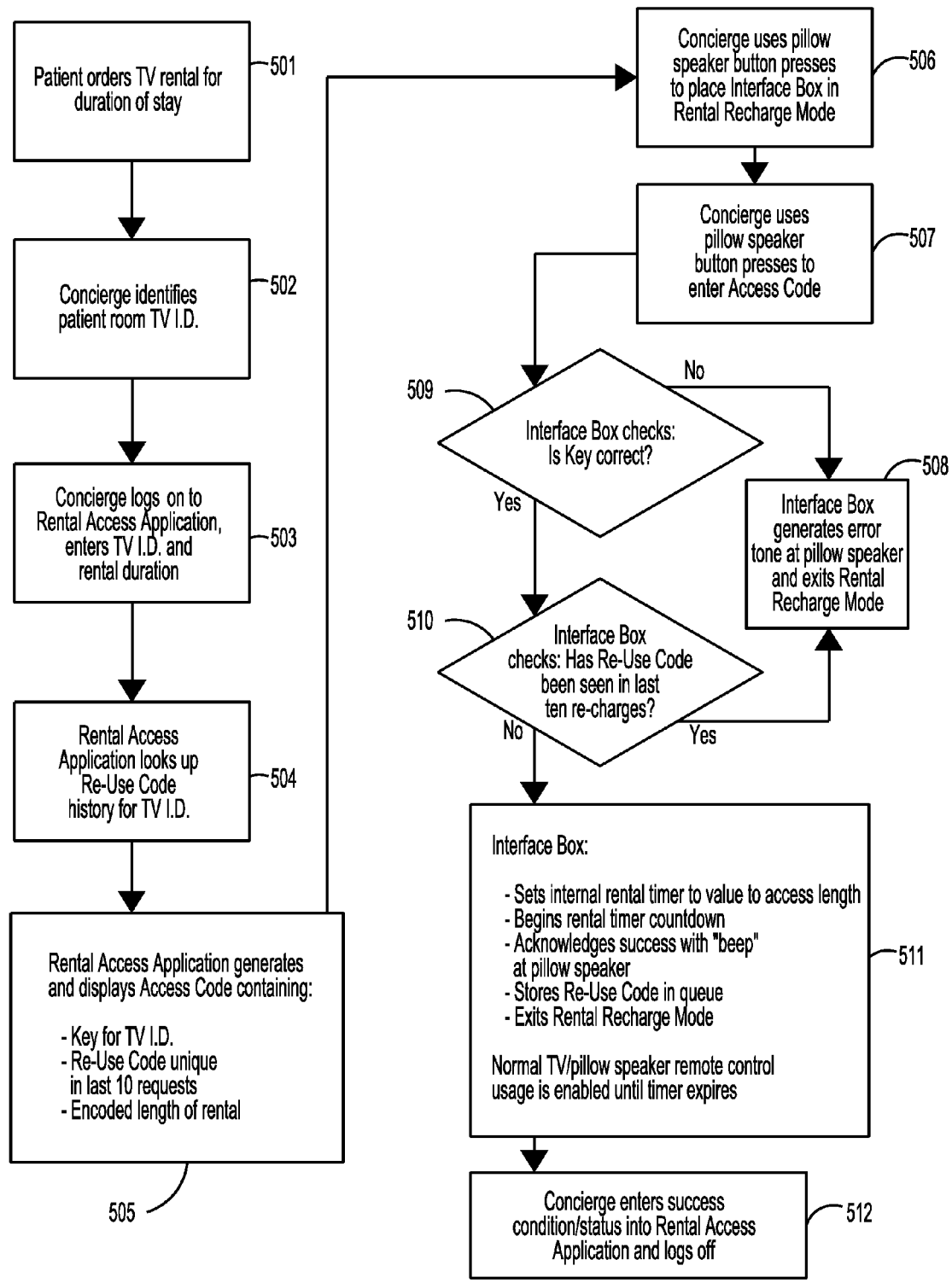
FIG. 5 is a flowchart showing a process, in accordance with an embodiment of the present invention, of how user access is securely enabled.

FIG. 5, referencing steps 501 through 512 flowcharts a generalized process for rental ordering, obtaining an access code, entering the access code and the handling of the access code by interface unit 103 of FIG. 1 for security and recharge purposes in accordance with an embodiment of the present invention. In FIG. 5 the role of the concierge is that of an administrative user employed by the facility, affiliated with the facility or otherwise under contract by the facility for purposes of processing patient requests for television rental and fulfilling those requests by enabling the television system for operation by obtaining a renat1 access code from a separate rental access application and then entering the access code, via pillow speaker 101 (FIG. 1), for processing by interface unit 103.

Interface unit 103 and operative software make use of non-volatile storage within microcontroller 230 (FIG. 2) to capture operational usage and access audit data. This data can be used for service and administrative purposes as well understanding usage patterns that may be used as factors in business decisions by the healthcare facility. Interface unit 103 (FIG. 1) stores operational parameters such as button presses, TV responses and pillow speaker encoding which might be useful to the owner and manufacturer to characterize different installation, operation and service scenarios. Advantages can be seen in the following scenarios: 1) As a facility considers provisioning content such as cable television, having the ability to understand actual usage, via stored usage information would provide data which could be used in negotiate vendor contracts, 2) In facilities where there is an active rental program then stored information about access can be used as information in a revenue sharing program (with a third party) and also as an indicator of how well secured the systems are from access which is not paid for; 3) stored information about usage time is useful in equipment service and replacement programs such as for LCD televisions where the backlight component has a rated lifespan, 4) historical performance characteristics about the operative software such as resets, timing of abnormal execution situations along with conditions preceding can be useful in troubleshooting and an aid to effective repair and future designs. 5) if there are installation or operation problems the IB could be placed in a special diagnostic state to capture input/output and internal processing actions and then use for later and remote analysis, such a situation where a particular set of pillow speakers has slightly different encoded signal timings. 6) Where the facility provides custom content that must be reviewed by the patient-user, such as post-surgery instructions, the information about the review can be stored and later downloaded into a medical record for the purposes of tracking compliance.

Interface unit 103 has, via user access operation control port 224 (FIG. 2), the means to connect to and operate with peripheral devices, such as USB drives and personal computers, whereby the operational software can report out and initiate extended administrative functionality including configuring interface unit 103 of FIG. 1, configuring devices attached to said interface unit such as television 107, upload to peripheral device the logs of operational, audit and compliance data, operate as an interactive debug port and perform the update of operative software. In addition to administrative functionality the user access operation port 225 (FIG. 2) provides access to entertainment, educational, promotional and hospitality content in forms such as digital audio files which the patient-user can then access from pillow speaker 101 (FIG. 1) using extended button press sequences. Finally, new USB and other devices are continually developed and together with microcontroller 201 (FIG. 2) and updates to the operative software new functionality can be created further enhancing the potential of the system as a whole. One such use might be to enable wireless communication and interaction with a patient's personal electronic devices such as smart phones which could themselves be running facility-supplied or third party applications developed for said interactions.

In another embodiment the audio connection between interface unit 103 (FIG. 1) and television 107 would be a digital optical audio signal with said interface unit 103 required to convert the digital signal format to analog and amplify for eventual transmission to pillow speaker 101. Though this would add to or replace an analog media connection, such as described in an embodiment previously described, this optical means of conveying television 107 media content eliminates the requirement to galvanically isolate this media connection thereby reducing cost and increasing reliability without impacting user safety. Additionally advantageous in having this type of media interface is that it increases the range of television make and models that can be mated with interface unit 103. Finally, the digital nature of these signals lend themselves to be manipulated such that media characteristics could be tuned by the interfacing hardware and operative software to produce the best possible media reproduction at pillow speaker 101.

In another embodiment the media and/or control connection between interface unit 103 (FIG. 1) and television 107 would be made via the HDMI interface. HDMI carries media content on the TDMS protocol and enables device control via the CEC protocol. The HDMI interface has become an expected means of connecting devices to consumer televisions with some models offering multiple HDMI receptacles and so this embodiment would extend the range of television makes and models compatible with interface unit 103.

A variation of the previously described embodiment's approach to the media connection between interface unit 103 to television 107 would be seen in interface unit 103 that accepts one but not both forms of analog audio types, that is, either the headphone type or the line-level type but not both. The interface unit of this embodiment would have reduced costs, especially in the model that was headphone type audio only. In addition such a unit might be more advantageously paired with a single type of television and create a more straightforward means of creating the audio connection and by limiting the choices forces a higher purchase volume which often results in lower acquisition costs.

In another embodiment in accordance with the present invention, using two optocouplers in a differential configuration of the invention would result in a very high-fidelity audio configuration as a result of high supply rejection, higher dynamic range and better linearity. Though this would most likely be a more costly than other solutions this could be marketed within a premium product category with acceptance most likely seen in private or high-end hospital facilities.

In another embodiment in accordance with the present invention, power for interface unit 103 could be taken from a variety of sources on television 107 such as a USB port, a RS-232 port, an HDMI port or a dedicated power port for the connection of set-top boxes. Such a design would potentially reduce the cost associated with supplying a separate power supply and simplify site preparation for installation with respect to provisioning power outlets.

In another embodiment interface unit 103 would have reduced isolation features and be marketed with or possibly without hospital grade listing. The medical grade DC power supply 104 may be redundant and together with the incorporation of design changes such as using a digital optical audio output connection from interface unit 103 to television 107 to produce a system that has a lower cost to manufacture.

In another embodiment many of the functions of microcontroller 230 (FIG. 2), operative software and circuitry supporting said microcontroller could be located within a pillow speaker device. While this embodiment would still use television 107 of FIG. 1 and interface unit 103, said interface unit would be limited to providing power with electrical isolation from mains and function as an interconnection and isolation point between television 107 and a modified pillow speaker 101. Advantages here are related to reducing the cost and complexity of the system of the previously described embodiment, including interface unit 103. There might be facilities objecting to having any equipment beyond what is in their existing configuration of one pillow speaker and one television and so for these customers this solution would achieve all of the benefits of reduced cost without the need to consider the configuration of the first embodiment.

In another embodiment rental access to the in-room television could be enabled centrally and wirelessly via the addition of a wireless module to interface unit 103 equipped to receive access codes from a computing device equipped with wireless communication and an application for generating said access codes.

In another embodiment the facility may choose to provide a discount to those patients who elect to opt-out of television watching. In this case interface unit 103 would be configured as in a rental except that for the duration specified the patient would have no ability to view or control television 107 from pillow speaker 101, until the timer expired after which the system would operate as expected. The advantage of this solution would be found in those facilities where it was seen as a good marketing practice to offer a discount for opting out as opposed to charging for opting-in. Also this alternative embodiment might reduce the number of patient requests to be fulfilled by administrative concierge function when the general population is found to have a preference for choosing television access over opting-out.

Figure 4:
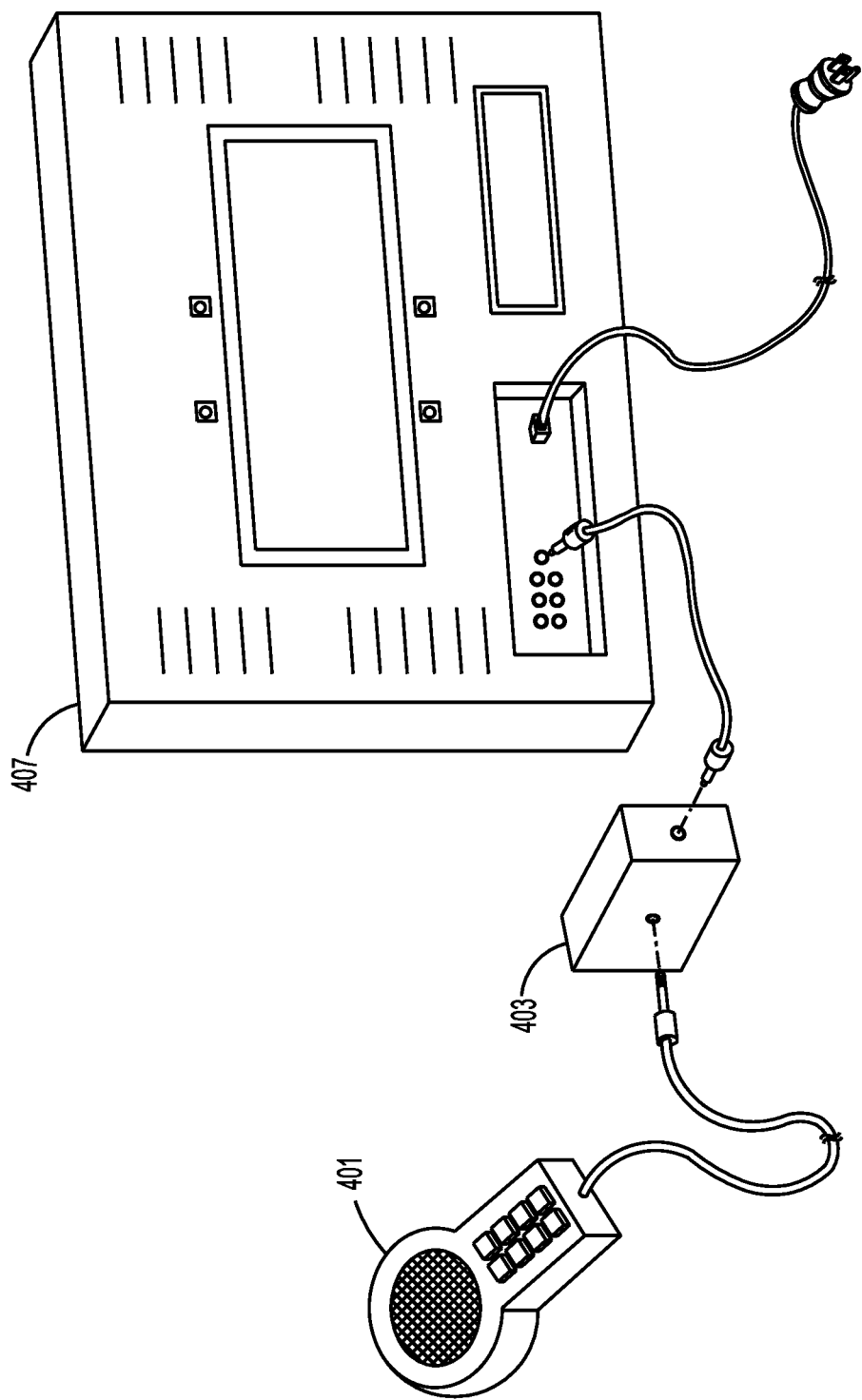
FIG. 4 shows an exemplary embodiment in accordance with an embodiment of the present invention of components that enables user access control with conventional hospital-grade televisions.

In another embodiment, which permits the healthcare facility to deploy a rental business model using existing hospital-grade televisions, is comprised of an interface monitor unit 403 (FIG. 4) interposed between a hospital-grade TV 407 and a pillow speaker 401. Interface monitor unit 403 would not require a separate power supply as it is able to use and store a portion of the operative power from that which is nominally sent to the pillow speaker 401 by the hospital-grade television 407. Interface monitor unit 403 would pass media output from hospital-grade television 407 through to pillow speaker 401. Interface monitor unit 403 receives and decodes encoded signals arising from pillow speaker 401 button presses. At the point of decoding button press signals interface monitor unit 401 has the option to retransmit or not retransmit encoded signals to hospital-grade television 407. Interface monitor unit 403 can be placed into administrative state through unique key press sequences at pillow speaker 401 and in the same manner as a described in the first embodiment a rental period can be started during which time interface monitor unit 403 re-transmits pillow speaker button press signals and when the rental period expires interface monitor unit 403 shuts down hospital-grade television 407 and by not re-transmitting effectively prevents the user from controlling hospital-grade television 407.

In addition to enabling a facility to consider and use a rental business model interface monitor unit 401 can be used with existing equipment. As interface monitor unit 403 is powered by hospital-grade television 407, achieving a recognized hospital-grade safety listing mark is simplified. This alternative embodiment could also make use of the opt-out embodiment where access is always enabled unless disabled for a configured duration of time and with the same benefits described above.

In another embodiment of interface monitor unit 403, said interface monitor unit would incorporate an electronic signal gate for preventing control signals from pillow speaker 401 from reaching hospital-grade television 407.

In another embodiment, electrical isolation between television 107 of FIG. 1. and interface unit 103 could be accomplished via the wireless transmission of media and external control port signals using short range radio and wireless protocols such as ZigBee; this wireless means of communication between interface unit 103 and television 107 would effectively replace control communications cable assembly 105 and media cable assembly 106. Interface unit 103 would be designed with a wireless capability and television 107 could have built in wireless capability or be outfitted with an attached wireless module. In this embodiment interface unit 103 would require fewer components and cost dedicated to galvanic isolation. Other advantages here include the need to have interface unit 103 in close proximity to television 107 which could also eliminate costs a facility incurs when installing cable for the three-wire connection from pillow-speaker 101 to television 107.

In another embodiment, feedback to the administrative or service user could be accomplished in a direct manner by making use of the ability by television 107 to display channel numbers when changing channels. The method would take numeric button-press events and switch television channels to confirm that the correct numeric button was pressed. As interface unit 103 and the pillow speaker 101 may lack visual displays this is an effective and cost-free means of providing real-time feedback to a user who would otherwise might not receive a confirmation of what button was pressed.

In another embodiment, interface unit 103 would routinely query television 107 about current channel selection, volume and other states and therefore said interface unit would be able to limit operational aspects of said television within the context of certain modes or facility installation preferences. One use for this feature would be to create levels or tiers of access to television programming such as basic and premium channel selections and thereby enhance the range of rental business models that a facility would be able to consider. The advantage of the invention in this system is that it inexpensively reproduces access features found in set-top boxes and server-based video distribution systems and can have a lower total cost of ownership when compared to centralized solutions administered by IT departments. Another use for this querying capability would be to limit the maximum volume level which is a feature found on more expensive commercial televisions and is highly desired in environments where there is a large concern for reducing noise. This ability by the interface unit to control contextual access to television features would also have ramifications in the hospitality industry creating a de-centralized system for generating revenue by selling varying levels of content access.

In another embodiment the secured access state of operation can be embedded in a hospital-grade television. Hospital grade televisions contain microprocessors which could be employed for this additional purpose and so there could be no additional cost to manufacture with this additional capability. The advantage of this method is that it brings all of the advantages of the decentralized model of renting where installations would not find a system of the first embodiment to be acceptable.

In another embodiment the selection of voltage levels provided by electronic assembly 201 could be increased to include −5V power so as accommodate even broader interface compatibility with the set of available and existing installations of pillow speakers.

In another embodiment interface unit 103 communicates with a set-top box remote control port instead of the remote control port of television 107. The advantage here of this type of control is where a facility has plans to install or has already installed a set-top box as part of the system for distribution of content to televisions (instead of via coaxial cable or antenna). Another advantage of this alternative embodiment is eliminating the need for a separate remote control for the set top box.

In another embodiment interface box 103 would accept closure type signals from a pillow speaker 101 instead of digital type commands. Closure signals are an older, simpler technology where signals result from closing switches on the pillow speaker. The advantage here is in creating interface box 103 to work in as many existing installations as possible.

In another embodiment interface unit 103 would transmit media content comprised of video and signals to a pillows speaker 101 equipped with a video display via pillow speaker communications port 109. In this embodiment, the environment of the patient's room is impacted even less than if the media content were to be provided partially through the pillow speaker 101 (e.g., the audio portion of the media content) and partially through television 107 (e.g., the video portion of the media content). This embodiment would be particularly important for hospital or healthcare environments where a room was shared by two or more patients concurrently.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A hospital grade entertainment interface device comprising:
   an interface unit;
   a plurality of communications ports communicatively connected to said interface unit,
   wherein one or more of said plurality of communications ports is a media communications port,
   wherein one or more of said plurality of communications ports is a control communications port,
   wherein one of said plurality of communications ports is a pillow speaker communications port,
   wherein said interface unit is capable of processing commands received from one or more of said plurality of communications ports,
   wherein said interface unit is capable of communicating media information via said one or more of said plurality of communications ports,
   wherein said interface unit is capable of communicating control information via said one or more of said plurality of communications ports,
   wherein said interface unit is capable of communicating media information via said pillow speaker communications port,
   wherein said interface unit galvanically isolates one or more devices connected to said interface unit from a pillow speaker connected to said pillow speaker communications port by providing an interface unit divided into two distinct electrical sections, an upper and lower section, wherein said upper and lower sections have no direct electrical connections and possess power and ground separate from each other, wherein said upper and lower sections are bridged only by a plurality of galvanic isolation components which provide galvanic isolation of power and signals, thereby providing isolated power to said lower section in which said pillow speaker communication port resides, and permitting operational interactions between said one or more devices and said pillow speaker, said one or more devices being connected to said upper section; and
   a power supply communicatively connected to said interface unit,
   wherein said power supply and said plurality of communications ports are galvanically isolated from said pillow speaker communications port.

2. The system of claim 1 wherein the power supply is provided by a medical grade power supply.

3. The system of claim 1 wherein said pillow speaker communications port is galvanically isolated from said plurality of communications ports.

4. The system of claim 1 wherein said media information may be comprised of one or more of audio information, data information and video information.

5. The system of claim 1 wherein said interface unit is capable of transmitting media content to said pillow speaker from one or more connected peripheral devices.

6. The system of claim 1 wherein the interface unit is further comprised of circuitry for enhancing fidelity and dynamic range of audio output to the pillow speaker communications port.

7. The system of claim 1, wherein said one or more galvanically isolated components comprise a power isolation component.

8. The system of claim 7, wherein said one or more galvanically isolated components comprise audio isolation components.

9. The system of claim 8, wherein said one or more galvanically isolated components comprise amp control isolation components.

10. The system of claim 9, wherein said one or more galvanically isolated components comprise data isolation components.

11. The system of claim 1, wherein one of said one or more devices is a television.

12. The system of claim 1, wherein said interface unit enables a pillow speaker to operate a television without use of a commercial grade control interface or set top box.

13. A method of controlling an entertainment system, by way of a hospital grade entertainment interface device, the method comprising the steps of:
   receiving, at an interface unit, a command from a pillow speaker communications port;
   processing said command at said interface unit into a control communication;
   transmitting said control communication via a communications port;
   processing media information received from a media communications port at said interface unit;
   transmitting media data via said pillow speaker communications port; and
   electrically isolating one or more devices or a power source connected to said interface unit from a pillow speaker connected to said pillow speaker communications port by providing an interface unit divided into two distinct electrical sections, an upper and lower section, wherein said upper and lower sections have no direct electrical connections and possess power and ground separate from each other, wherein said upper and lower sections are bridged only by a plurality of galvanic isolation components which provide galvanic isolation of power and signals, thereby providing isolated power to said lower section in which said pillow speaker communication port resides, and permitting operational interactions between said one or more devices and said pillow speaker, said one or more devices being connected to said upper section.

14. The method of claim 13 further comprising the step of:
   removing electrical noise from an audio signal path in said interface unit.

15. The method of claim 13 further comprising the step of:
   maintaining dynamic range and frequency response of said media information without introducing harmonic electrical noise.

16. The method of claim 13 further comprising the step of:
   communicating isolated electrical power via said pillow speaker communications port.

17. The method of claim 13 further comprising the steps of:
   receiving a rental access code via a communications port;
   processing said rental access code at said interface unit;
   setting said interface unit into a state based on said processing of said rental access code, wherein said state enables control and viewing access of a television by a pillow speaker for a set duration of time if said rental code is valid; and
   sending a control signal via said control communications port.

18. The method of claim 17 further comprising the step of:
   determining, at said interface unit, whether said rental access code is valid.

19. The method of claim 13, wherein said interface device galvanically isolates a consumer television from a hospital grade pillow speaker.

20. The method of claim 13 further comprising the steps of:
receiving, at said interface unit, a rental access code from a galvanically isolated pillow speaker communications port;
processing said rental access code at said interface unit into a control communication;
determining, at said interface unit, whether said processed rental access code is valid; and
setting said interface unit into a state based on said processing of said rental access code, wherein said state enables control and viewing access of a television by a pillow speaker for a set duration of time if said rental access code is valid.

21. The method of claim 20 further comprising the steps of:
receiving, at said interface unit, a command from said pillow speaker communications port; and
determining, at said interface unit, whether said command is permissible.

22. The method of claim 21 further comprising the steps of:
transmitting, from said interface unit, a control communication via a communications port when said command is determined to be permissible;
processing media information received from a media communications port at said interface unit; and
transmitting media data via said pillow speaker communications port.

23. The method of claim 13 further comprising the step of:
galvanically isolating said pillow speaker communications port.

24. The method of claim 13 further comprising the step of:
removing electrical noise from a media information signal path in said interface unit.

25. The method of claim 13 further comprising the step of:
maintaining, at said interface unit, dynamic range and frequency response of said media information without introducing harmonic electrical noise.

* * * * *